United States Patent [19]

Watson

[11] Patent Number: 4,488,440
[45] Date of Patent: Dec. 18, 1984

[54] MICROPOWER CIRCUIT

[75] Inventor: Christopher A. Watson, Upland, Calif.

[73] Assignee: International Telephone & Telegraph Corporation, New York, N.Y.

[21] Appl. No.: 472,531

[22] Filed: Mar. 7, 1983

[51] Int. Cl.³ .............................................. G01F 15/06
[52] U.S. Cl. .................................. 73/861.77; 377/21
[58] Field of Search ....................... 73/861.77, 861.78; 307/120, 118, 140, 132 EA; 377/21, 82

[56] References Cited

U.S. PATENT DOCUMENTS

| | | | |
|---|---|---|---|
| 2,295,118 | 9/1942 | Le Clair | 377/21 |
| 2,988,916 | 6/1961 | Waugh | 73/861.77 |
| 3,069,907 | 12/1962 | Eddy | 73/861.77 |
| 3,783,248 | 1/1974 | Sugden Jr. | 377/21 |

Primary Examiner—Herbert Goldstein
Attorney, Agent, or Firm—T. L. Peterson; E. C. Jason

[57] ABSTRACT

A totalizer of the decade counter type or the like which, when being pulsed, tends to drain a battery, where the battery and totalizer are remotely located. The battery thus needs to have a long life because of its remote location. The same is effected by a circuit including a voltage regulator which holds average power constant, at least from pulse to pulse.

5 Claims, 3 Drawing Figures

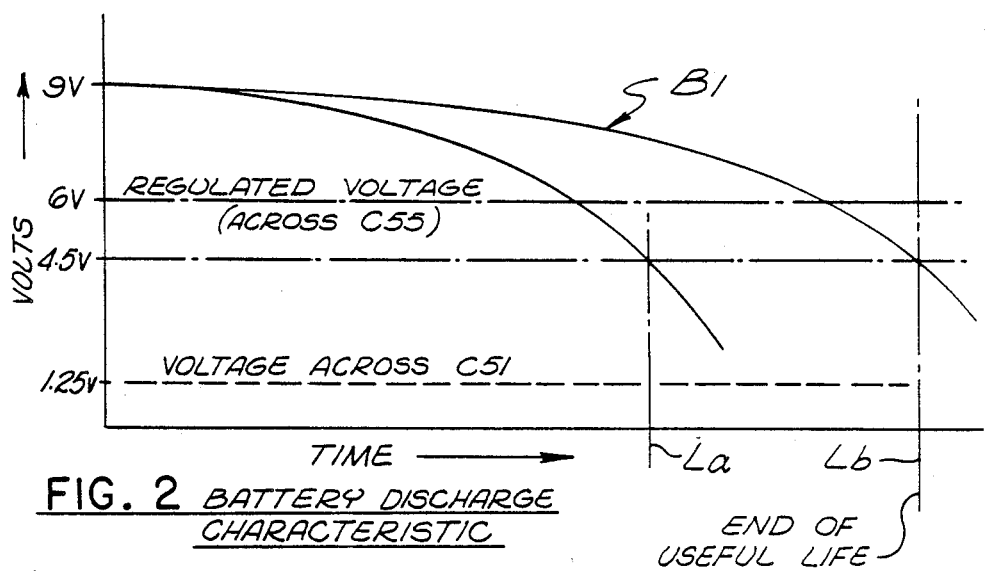
FIG. 2 BATTERY DISCHARGE CHARACTERISTIC
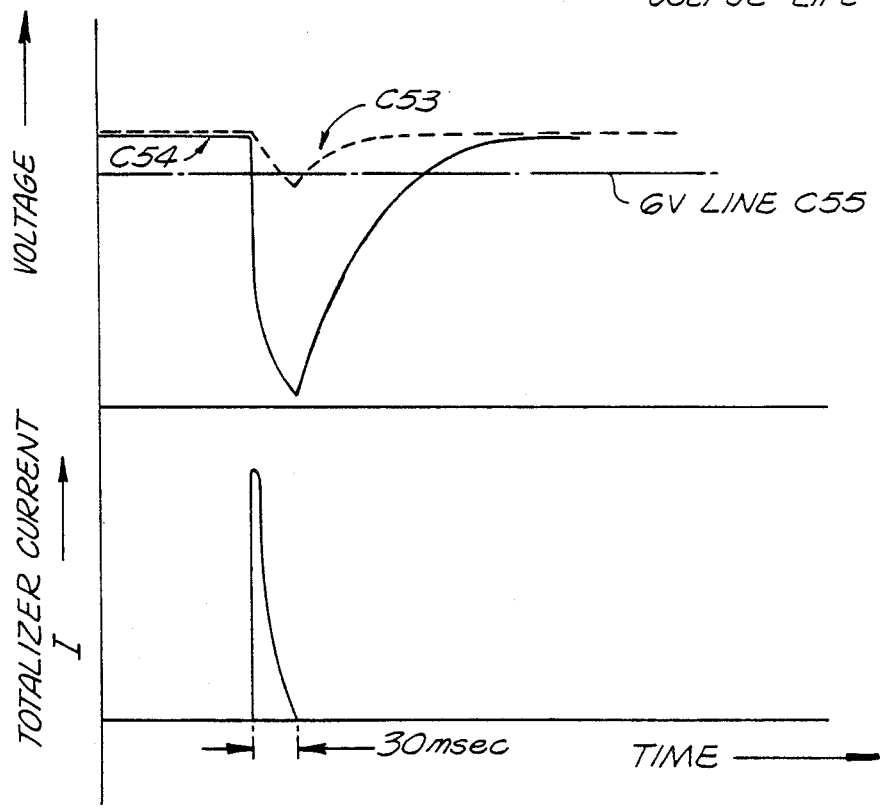
FIG. 3 TOTALIZER PULSE

MICROPOWER CIRCUIT

BACKGROUND OF THE INVENTION

This invention relates to battery powered totalizers, and more particularly the same for use in remote locations.

PRIOR ART STATEMENT

Conventional turbine meters produce output pulses at a rate directly proportional to the volume fluid flow rate.

It is old in the art to count turbine meter pulses. Decade counters may thus be used to count such pulses and then to indicate the total volume flow. Such decade counters may be similar to or different from those disclosed in Tancred U.S. Pat. No. 3,554,051 issued Jan. 12, 1971, Affel U.S. Pat. No. 3,578,792 issued May 18, 1971, and Affel U.S. Pat. No. 3,602,426 issued Aug. 31, 1971.

Batteries are employed in remote locations for counter operations, but the same have short lives.

SUMMARY OF THE INVENTION

In accordance with the micropower circuit of the present invention, the above-described and other disadvantages of the prior art are overcome by providing a voltage regulator for a D.C. source of potential.

BRIEF DESCRIPTION OF THE DRAWINGS

In the accompanying drawings which illustrate exemplary embodiments of the present invention:

FIG. 2 shows battery voltage curves;
and
FIG. 3 shows totalizer current and capacitor voltage curves.

DESCRIPTION OF THE PREFERRED EMBODIMENT

Figure 1:
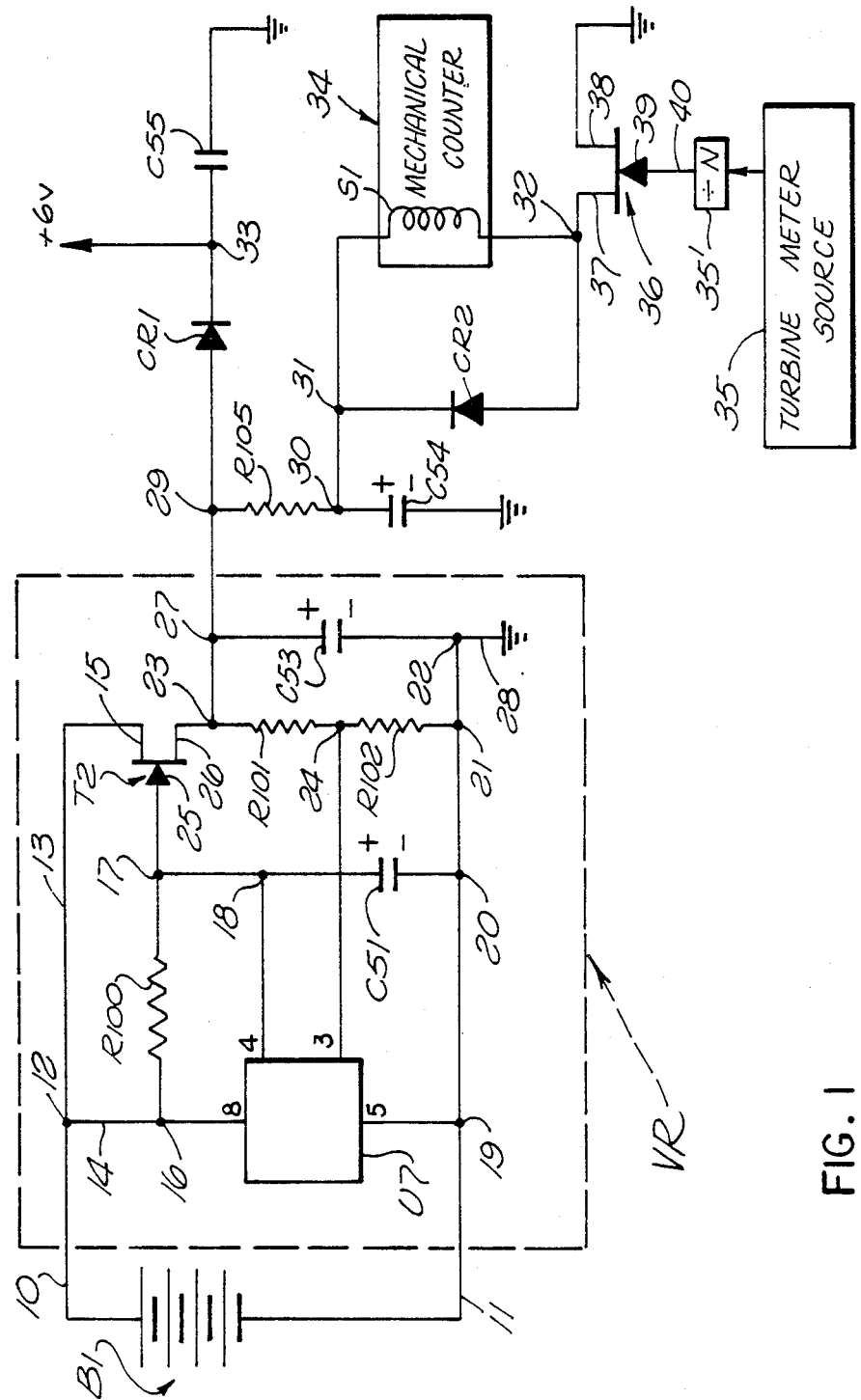
FIG. 1 is a schematic diagram of one embodiment of the present invention.

In FIG. 1 a battery B1 having, for example, an unregulated output voltage of 9.0 volts, is connected to a voltage regulator VR over leads 10 and 11. Lead 10 is connected to a junction 12. Leads 13 and 14 are respectively connected from junction 12 to a drain 15 of a field effect transistor (FET) T2 and to a junction 16.

A resistor R100 is connected from junction 16 to a junction 17. Junction 17 is connected to a junction 18.

Junctions 19, 20, 21, and a second junction 22 are connected together from a lead 11 to ground 25. Junctions 23 and 24 are also provided. FET T2 has a gate 25 and a source 26 connected from junction 17 and junction 23, respectively.

A resistor R101 is connected between junctions 23 and 24. A resistor R102 is connected between junctions 24 and 21. A capacitor C51 is connected between junctions 18 and 20.

U7 is a conventional micropower bipolar monolithic integrated circuit (IC) of the ICL8212 type made by Intersil, Inc., 10710 North Tantan Avenue, Cupertino, Calif. 95014.

Voltage regulator VR is also conventional.

Pins 8, 4, 3 and 5 of IC U7 are connected to junctions 16, 18, 24 and 19, respectively.

A capacitor C53 is connected from a first junction 27 and second junction 22.

Third, fourth, fifth, sixth and seventh junctions 29, 30, 31, 32 and 33, respectively, are also provided. Junctions 27 and 29 are connected together. A resistor R105 is connected between junctions 29 and 30. Junctions 30 and 31 are connected together.

A capacitor C54 is connected from junction 30 to ground. A mechanical counter 34 is conventional and may be of the type disclosed in any one of the aforementioned patents.

Counter 34 has an electromagnetic actuator coil S1 that cycles the same or drives the same decade one digit place for each N pulses out of a turbine meter 35. A divider 35' is connected from turbine meter 35 to a lead 40.

Coil S1 and a diode CR2 are connected in parallel between junctions 31 and 32, diode CR2 being poled to be conductive in a direction toward junction 31.

A FET 36 is provided with a drain 37 connected from junction 32, a source 38 connected to ground, and a gate 39 connected from lead 40.

Six volts regulated is provided from junction 33. A capacitor C55 is connected from junction 33 to ground.

Diode CR1 isolates the regulated voltage from the transients caused by the discharge of C54 when the electronic switch (FET 36) is closed. Diode CR2 is a free wheeling diode that allows the $LI^2/2$ energy stored in coil S1 to dissipate, where L is inductance and I is current.

The voltage between junctions 27 and 22 is regulated to about 6.0 volts. This voltage changes during the transient response to the grounding of junction 32 via FET 36 when gate 39 receives a pulse over lead 40.

Grounding of junction 32 causes capacitor C54 to discharge current through coil S1 until the voltage of capacitor C54 is near or at zero. The voltage across capacitor C53, during this period, declines somewhat while the charge on capacitor C54 is partially replaced by the change on capacitor C53.

Note will be taken from FIG. 2 that the present invention makes possible the use of battery B1 over a period of time 50% longer (an outstanding advantage) than the otherwise, for example, 6 month life of battery B1 without regulator VR. Power is saved by providing a lower regulated voltage.

The schematic diagram for the ICL8212 has been published. The suffix CPA is unnecessary as any other conventional code can be substituted.

Terminals of U7 are shown in FIG. 1.

Pin 8 is the V+ input.

Pin 4 is an output which is either open circuit or short circuit.

Pin 3 is a pin the voltage imposed at which is compared with an internal constant reference voltage to determine whether output pin 4 is open or shorted.

Pin 5 is ground or 0 volts.

The voltage regulator application is described on page 5-251 of an Intersil application note. Capacitors C51 and C53 maintain the stability of the regulator (on/off) system. Capacitor C55 is a storage capacitor which supports the system voltage.

All capacitors are charged prior to receipt of turbine meter pulses. Capacitor C54 will be totally discharged by the totalizer and capacitor C53 partly so.

Battery life: The totalizer requires a 6-volt pulse, 30 msec. in duration. It has been established that a 1000 mfd. capacitor charged to 6 volts provides the necessary input energy.

Note: (a) 6 volt 340 ma., 30 msec. corresponds to a 2.04 watts for 30 msec. 61.2 mJoules (b) A 1000 mfd. capacitor charged to 6 volts has a stored energy of $\frac{1}{2}$ CV$^2$ = 18.0 mJoules This smaller energy is adequate because the surge current to activate the totalizer is much higher than the hold current required to maintain closure. The capacitor discharge provides this kind of current pulse.

If the 9-volt battery were not regulated to 6 volts, then the energy used per count would be 40.5 mJoules ($\frac{1}{2}$ CV$^2$).

The battery system has a total energy capacity of approximately 38,800 Joules (volts × amp. × hours). Not all of this energy can be used usefully. As the batteries are used, so the voltage drops. *A feature of the regulator is that when the battery voltage falls below 6 volts (the regulator control voltage), then the output voltage will track the battery voltage with minimum differential.* The end point is reached when the battery has fallen to 4.5 volts and the totalizer will no longer operate.

The system in the micropower totalizer may be operated for $1.8 \times 10^6$ counts, i.e., an energy usage of $1.8 \times 10^6 \times 18.0 \times 10^{-3}$ Joules (32,400 Joules).

This is over 80% of total capacity. This is the same with or without the regulator. If no regulator were used, then the period when the battery was greater than 6 volts would be a period when energy would be used extravagantly (say average volts during this period equal 7.5 volts). Hence, energy/count would be 28.1 mJoules, in place of 18.0 Joules.

In FIG. 3, $L_a$ may be the end of the useful life of the battery without voltage regulation. $L_b$ may be the same with voltage regulation. For example, $L_a$ may be equal to 6 months, and $L_b$ may be equal to 9 months.

The circuit components may have the following values:

Battery B1: 9 volts;
Capacitor C51: 1.0 μfarad;
Capacitor C53: 1.0 μfarad;
Capacitor C54: 1000 μfarad;
Capacitor C55: 470 μfarad;
Diode CR1: IN914;
Diode CR2: IN914;
FET T2: U113;
Resistor R100: 1.1 megohms;
Resistor R101: 4.7 megohms;
Resistor R102: 1.1 megohms;
Resistor R105: 680 ohms.

What is claimed is:

1. A flowmeter comprising: a turbine meter having an output lead, said turbine meter producing pulses on said output lead; a battery; a totalizer having an actuator and a counter for indicating the total number of pulses applied to the actuator; a voltage regulator having a pair of input terminals connected across the battery and a pair of output terminals, a resistor and a capacitor connected in series across said output terminals; a transistor having a power circuit for controllably connecting the actuator across the capacitor and a control circuit connected to the output lead of the turbine meter; said voltage regulator being of the type which establishes a predetermined approximately constant output voltage when the battery voltage is substantially greater than said predetermined voltage, and which establishes an output voltage that tracks the battery voltage when the battery voltage falls below said predetermined voltage.

2. The flowmeter of claim 1 in which the transistor is a junction field effect transistor.

3. The flowmeter of claim 1 in which the voltage regulator includes a junction field effect transistor connected between the input and output terminals of the regulator.

4. The flowmeter of claim 2 in which the voltage regulator includes a junction field effect transistor connected between the input and output terminals of the regulator.

5. The flowmeter of claim 1 in which the voltage regulator is a switching-type regulator.

* * * * *